US009165553B2

(12) United States Patent
Kurata et al.

(10) Patent No.: US 9,165,553 B2
(45) Date of Patent: Oct. 20, 2015

(54) INFORMATION PROCESSING DEVICE, LARGE VOCABULARY CONTINUOUS SPEECH RECOGNITION METHOD AND PROGRAM INCLUDING HYPOTHESIS RANKING

(71) Applicant: International Business Machines Corporation, Armonk, NY (US)

(72) Inventors: Gakuto Kurata, Tokyo (JP); Masayuki Suzuki, Tokyo (JP); Masafumi Nishimura, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

(21) Appl. No.: 13/744,963

(22) Filed: Jan. 18, 2013

(65) Prior Publication Data
US 2013/0191129 A1 Jul. 25, 2013

(30) Foreign Application Priority Data

Jan. 19, 2012 (JP) ................................ 2012-008732

(51) Int. Cl.
G10L 15/04 (2013.01)
G10L 15/10 (2006.01)
G10L 15/02 (2006.01)

(52) U.S. Cl.
CPC ................ *G10L 15/04* (2013.01); *G10L 15/10* (2013.01); G10L 2015/025 (2013.01)

(58) Field of Classification Search
CPC ..................................................... G10L 15/04

USPC ......................................................... 704/254
See application file for complete search history.

(56) References Cited

U.S. PATENT DOCUMENTS 7,991,615 B2 * 8/2011 Li et al. ......................... 704/254

FOREIGN PATENT DOCUMENTS

JP 2011-243147 A 12/2011

OTHER PUBLICATIONS

N. Minematsu, "Yet another acoustic representation of speech sounds," Proc. ICASSP, pp. 585-588, 2004.
N. Minematsu, et.al., "Speech structure and its application to robust speech processing," Journal of New Generation Computing, vol. 28, No. 3, pp. 299-319, 2010.

(Continued)

Primary Examiner — Susan McFadden
(74) Attorney, Agent, or Firm — Scully, Scott, Murphy & Presser, P.C.; Gail H. Zarick, Esq.

(57) ABSTRACT

System and method for performing speech recognition using acoustic invariant structure for large vocabulary continuous speech. An information processing device receives sound as input and performs speech recognition. The information processing device includes: a speech recognition processing unit for outputting a speech recognition score, a structure score calculation unit for calculation of a structure score that is a score that, with respect for each hypothesis concerning all phoneme pairs comprising the hypothesis, is found by applying phoneme pair-by-pair weighting to phoneme pair interdistribution distance likelihood and then performing summation, and a ranking unit for ranking the multiple hypotheses based on a sum value of speech recognition score and structure score.

14 Claims, 8 Drawing Sheets

(56) References Cited

OTHER PUBLICATIONS

Takao Murakami, et. al. (3 additional persons), "Automatic recognition of Japanese language vowel series using structural representation of speech," The Institute of Electronics, Information, and Communication Engineers, technical report, vol. 105, No. 98, pp. 13-18.
Y. Qiao, et.al., "A study of Hidden Structure Model and its application of labeling sequences," Proc. ASRU, pp. 118-123, 2009.
Y. Qiao, et.al., "On invariant structural representation for speech recognition: theoretical validation and experimental improvement," Proc. Interspeech, pp. 3055-3058, Sep. 6-10, 2009.
M. Suzuki, et.al., "Integration of multilayer regression with structure-based pronunciation assessment," Proc. Interspeech, pp. 586-589, Sep. 26-30, 2010.
M. Suzuki, et.al., "Continuous Digits Recognition Leveraging Invariant Structure," Proc. Interspeech, pp. 993-996, Aug. 28-31, 2011.
Japanese Office Action dated Apr. 21, 2015 issued in JP 2012-008732.

* cited by examiner (a)   (b)

feature vector series    } S300
phoneme alignment
Gaussian distribution    } S305
edge                     } S310

FIG. 6

*structure score vector of "ko_nnichiwa"*

$$\begin{matrix} a\text{-}i \\ a\text{-}u \\ a\text{-}e \\ a\text{-}o \\ \vdots \end{matrix} \begin{bmatrix} xx \\ 0 \\ 0 \\ yy \\ \vdots \end{bmatrix}$$

FIG. 9

|  | replacement / insertion / deletion error | character error rate (%) |
|---|---|---|
| HMM-based voice recognition | 422 / 56 / 64 | 3.59% |
| the present invention | 401 / 44 / 61 | 3.35% |

INFORMATION PROCESSING DEVICE, LARGE VOCABULARY CONTINUOUS SPEECH RECOGNITION METHOD AND PROGRAM INCLUDING HYPOTHESIS RANKING

TECHNICAL FIELD

The present invention relates to technology for performing speech recognition by use of acoustic invariant structure. More specifically, the present invention relates to a program, large vocabulary continuous speech recognition method, and an information processing device for performing speech recognition by using acoustic invariant structure with respect to large vocabulary continuous speech.

BACKGROUND ART

The vocal signal is changed variously according to non-linguistic factors such as age, sex, microphone, background noise, or the like. Therefore speech recognition is required to be robust with respect to non-linguistic factors. In recent years, acoustic invariant structure is being proposed as one technique for realizing this type of speech recognition (Non-Patent Literature 1). According to this method, in contrast to traditional speech processing, the absolute features of speech are entirely discarded, and f-divergence is used for modeling of the relative relationships between phonemes. Isolated word recognition (Non-Patent Literatures 2, 3, and 4), foreign language pronunciation evaluation (Non-Patent Literature 5), or the like have been proposed heretofore using acoustic invariant structure, and robustness and good performance are being displayed by acoustic invariant structure.

However, according to the aforementioned literature, acoustic invariant structure has not been used for continuous speech recognition. This has been due to the lack of a suitable decoding algorithm for use of acoustic invariant structure. Although a decoding algorithm performs hypothesis-by-hypothesis alignment of the feature vector sequence, alignment of phonemes becomes necessary in order to use acoustic invariant structure. Although there has also been research that attempts to solve the aforementioned problem by using bottom-up clustering of the short time interval of the feature vector sequence and the Hidden Structure Model (HSM), this approach was only applied to an artificial task and was not indicated to be effective for actual tasks (Non-Patent Literature 6).

Therefore under the aforementioned circumstances, a method was newly proposed for realization of continuous speech recognition by using acoustic invariant structure for an N-best ranking framework (Non-Patent Literature 7). According to this method, firstly based on the traditional hidden Markov model (HMM) based speech recognition processing, an N-best list is acquired together with a speech recognition score. Thereafter, acoustic invariant structure is extracted from phoneme alignment for each N-best hypothesis, and appropriateness of a hypothesis from the standpoint of this invariant structure is acquired as a structure score. Finally, the multiple hypotheses of N-best are ranked according to the values of the sums of the speech recognition scores and the structural scores.

CITATION LIST

Non-Patent Literature

Non-Patent Literature 1: N. Minematsu, "Yet another acoustic representation of speech sounds," Proc. ICASSP, pp. 585-588, 2004.

Non-Patent Literature 2: N. Minematsu, et. al., "Speech structure and its application to robust speech processing," Journal of New Generation Computing, Vol. 28, No. 3, pp. 299-319, 2010.

Non-Patent Literature 3: Y. Qiao, et. al., "On invariant structural representation for speech recognition: theoretical validation and experimental improvement," Proc. INTERSPEECH, pp. 3055-3058, 2009.

Non-Patent Literature 4: Takao Murakami, et. al. (3 additional persons), "Automatic recognition of Japanese language vowel series using structural representation of speech," The Institute of Electronics, Information, and Communication Engineers, technical report, vol. 105, no. 98, pp. 13-18.

Non-Patent Literature 5: M. Suzuki, et. al., "Integration of multilayer regression with structure-based pronunciation assessment," Proc. INTERSPEECH, pp. 586-589, 2010.

Non-Patent Literature 6: Y. Qiao, et. al., "A study of Hidden Structure Model and its application of labeling sequences," Proc. ASRU, pp. 118-123, 2009.

Non-Patent Literature 7: M. Suzuki, et. al., "Continuous Digits Recognition Leveraging Invariant Structure," Proc. INTERSPEECH, pp. 993-996, 2011.

SUMMARY OF THE INVENTION

Technical Problems

However, although the method disclosed by Non-Patent Literature 7 works for a continuous digit speech recognition task, improvement of recognition rate was not indicated for a large vocabulary continuous speech recognition task.

The present invention was developed in order to solve the aforementioned problems. The object of the present invention is to provide an information processing device, large vocabulary continuous speech recognition method, and program in order to improve speech recognition using the existing acoustic invariant structure and to make possible an improvement of the recognition rate with respect to large vocabulary continuous speech recognition.

Solution to Problems

In order to attain the aforementioned object, the invention of the present application uses a large vocabulary continuous speech recognition method that is executed by a computer. This type of large vocabulary continuous speech recognition method is executed by a computer; and the method includes the steps of: (a) acquiring by the computer a speech data as input; (b) performing by the computer speech recognition with respect to the acquired speech data, and outputting a plurality of hypotheses that are a recognition result with a plurality of speech recognition scores, each speech recognition score being a score indicating correctness of a speech recognition result for each hypothesis; (c) calculating by the computer a structure score for each hypothesis, the structure score being obtained by, for all pairs of phonemes consisting of the hypothesis, multiplying a likelihood of inter-distribution distance of a pair of phonemes by weighting for the pair of phonemes and performing summation; and (d) determining by the computer a total value of the structure score and the speech recognition score for each hypothesis, and based on the total value, ranking the plurality of hypotheses.

Preferably the large vocabulary continuous speech recognition method further includes the step of: (e) performing by the computer steps (b) and (c) with respect to speech data for training and learning pair-by-pair weightings for the phoneme pairs so as to correctly perform hypothesis ranking by the summation value of the speech recognition score and the structure score. Further preferably, in the step (e), the learning of pair-by-pair weights of the phoneme pairs is performed by taking a hypothesis having a zero word error rate or a lowest word error rate as a positive example and by taking remaining hypotheses as negative examples.

Further preferably, in the step (c), the computer multiplies the inter-distribution distance likelihood of the phoneme pair by a frame count of the phoneme and divides by number of different combinations of pairs of phonemes appearing within the hypothesis to normalize the likelihood. Further preferably, in the step (c), the computer multiplies the likelihood of the inter-distribution distance of the pair of phonemes by a frame count of the phonemes so as to normalize the likelihood.

Moreover, preferably in the step (c), the pair-by-pair weightings of the phonemes pairs are set such that weightings between pairs of vowel sounds and weightings of pairs relating to silence are set higher than weightings concerning pairs of other phonemes.

The invention of the present application was explained above as a large vocabulary continuous speech recognition method. However, the invention of the present application may be also understood as a large vocabulary continuous speech recognition program run by a computer executing this type of large vocabulary continuous speech recognition method, and the invention of the present invention may be understood as an information processing device for large vocabulary continuous speech recognition executed by installation on a computer of this type of large vocabulary continuous speech recognition program.

Effect of the Invention

According to the aforementioned configuration of the invention of the present application, due to weighting of the inter-distribution distance likelihood of the pair of phonemes during calculation of the structure score, it becomes possible to correctly treat the relative relationship between phonemes that are not importantly mutually related and phonemes that have an important relative relationship for speech recognition. As a result, during speech recognition using acoustic invariant structure, it is possible to cause an improvement with respect to large vocabulary continuous speech recognition. Moreover, the structure score is calculated by normalization in the time direction, then it becomes possible to infer further stable weighting for the learning weights, and it is possible to greatly improve the recognition rate. Other effects of the invention of the present application will be understood from the descriptions of each of the embodiments.

BRIEF DESCRIPTION OF DRAWINGS

FIG. 6 shows an example of a structure score vector prior to weighting.

FIG. 9 is a drawing showing results of an experiment.

DESCRIPTION OF EMBODIMENT

Although a preferred embodiment for implementation of the invention of the present application will be explained below in detail based on figures, the below described embodiment does not limit the invention according to the scope of the claims, and all combinations of features explained during the embodiments are not necessarily needed as means for solution of the invention. Furthermore, the same reference symbols will be applied to the same elements throughout the entire explanation of the embodiments.

Figure 1:
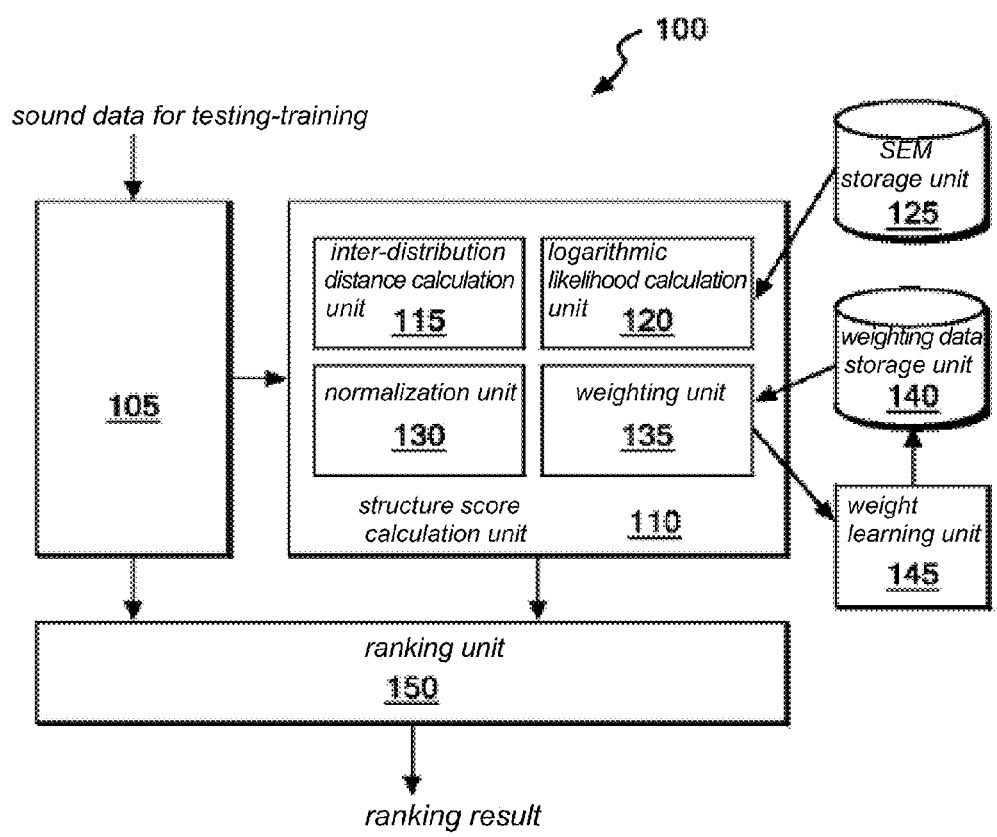
FIG. 1 shows an example of function configuration of an information processing device 100 according to an embodiment of the invention of the present application.

FIG. 1 shows an example of function configuration of an information processing device 100 according to an embodiment of the invention or the present application. The information processing device 100 includes a speech recognition processing unit 105, a structure score calculation unit 110, a statistical edge model (SEM) storage unit 125, a weighting data storage unit 140, a weight learning unit 145, and a ranking unit 150.

When sound data for testing are entered into the information processing device 100, the speech recognition processing unit 105 performs speech recognition on the sound data by the N-best method and then outputs the N-best hypothesis list and speech recognition score. The structure score calculation unit 110 extracts acoustic invariant structure from N-best hypothesis-by-hypothesis phoneme alignment and outputs the relevance of the hypothesis from the standpoint of such acoustic invariant structure while considering the degree of importance of the relationship of the phoneme pairs. The structure score calculation unit 110 also performs time direction normalization during calculation of structure score. The ranking unit 150 finds the sum values of the hypothesis-by-hypothesis speech recognition scores and structure scores, and newly applies revised ranking in order of size of the total value of the N hypotheses.

Figure 2:
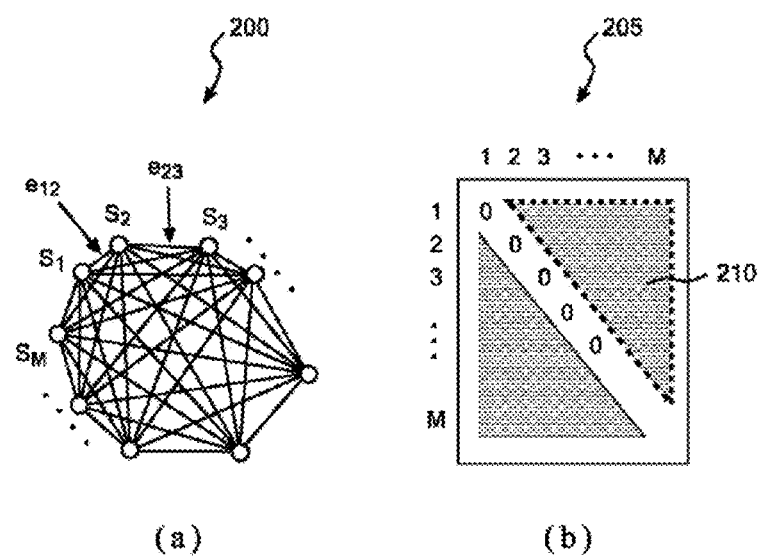
FIG. 2(a) is a drawing for explanation of acoustic invariant structure.
FIG. 2(b) shows a distance matrix for expression of the acoustic invariant structure shown in FIG. 2(a).

The weight learning unit 145 uses output of the speech recognition processing unit 105 outputting sound data for learning having associated correct-answer labels and uses output of the structure score calculation unit 110. The weight learning unit 145, for each phoneme pair, learns weighting that indicates the importance of the relative relationship of the phoneme pair during speech recognition. The weighting data storage unit 140 stores the phoneme pair-by-pair relative relationship weighting data learned by the weight learning unit 145. The statistical edge model storage unit 125 stores the phoneme pair-by-pair inter-distribution distance distributions. The data stored respectively in the statistical edge model storage unit 125 and the weighting data storage unit 140 are referenced by the structure score calculation unit 110 in order to calculate the structure score. Although the functions of each constituent element are described in more detail below, acoustic invariant structure will be described beforehand while referring to FIG. 2.

FIG. 2(a) is a drawing for explanation of an acoustic invariant structure 200. When the total count of phonemes present in the target language is taken to be M, the acoustic invariant structure 200 is composed of M nodes $S_i$ (i=1, ..., M) and edges $e_{ij}$ (i=1, ..., M; and j=1, ..., M; although i≠j). Each node Si is an acoustic event distribution and indicates each state of an acoustic model (e.g. HMM model). The edge length indicates the inter-distribution distance between two nodes $S_i$ and $S_j$. The f-divergence may be used as a function for determining the inter-distribution distance. Although divergence is used as an indicator for measurement of distance between probability distributions in information theory and statistics, f-divergence was introduced by Csiszar as a general divergence class so as to include various types of divergences. For details of f-divergence, for example, refer to Y. Qiao, N. Minematsu, "A study on invariance of f-divergence and its application to speech recognition," IEEE Trans. on Signal Processing, Vol. 58, No. 87, pp. 3884-3890, 2010.

The aforementioned acoustic invariant structure may be expressed mathematically as a distance matrix 205 as shown in FIG. 2(b). When a symmetrical distance scale criterion (e.g. Bhattacharyya distance) is selected as f-divergence, the triangular component 210 may express all information of the distance matrix. When the upper triangular component 201 of the distance matrix is realigned into a vector, the result is termed the structure vector. The structure vector is a vector that has M(M−1)/2 dimensions. That is to say, it is possible to express the acoustic invariant structure as the structure vector.

Next, returning to FIG. 1, the function of each of the constituent elements will be explained. The speech recognition processing unit 105 performs speech recognition based on the N-best method with respect to sound data input to the information processing device 100. The speech recognition processing unit 105 outputs N-best hypotheses (i.e. recognition results) together with speech recognition scores (i.e. scores indicating apparent correctness of these hypotheses). More specifically, when a sound signal converted to a digital signal is input and a speech analysis processing unit (not illustrated) outputs a feature vector sequence based on short time period frequency analysis, the speech recognition processing unit 105 is composed of a recognition engine (not illustrated) for searching for the maximum likelihood hypothesis while performing prediction-likelihood calculations, with respect to the extracted feature vector sequence, using a language model and acoustic model. Examples of the utilized feature vector include the Mel-frequency cepstral coefficient, the delta thereof, and delta-delta thereof. A word N-gram model or the like statistical language model may be used as the language model, and an HMM model may be used as the acoustic model.

In order for the speech recognition processing unit 105 to target large vocabulary continuous speech recognition that permits the input speech to have a large vocabulary and permits continuous speech, the search space for likelihood calculation by the recognition engine becomes large-sized. The speech recognition processing unit 105 uses the N-best method, and with respect to the input speech, finds N hypotheses and outputs hypotheses in order of highest likelihood. Furthermore, speech recognition itself by the N-best method is a previously known technology (e.g., see Brian Roark, et. al., "Corrective language modeling for large vocabulary ASR with the perceptron algorithm," Proc. ICASSP, pp. 749-752, 2004), and detailed explanation of this method will be omitted since this method is not the gist of the present invention.

The speech recognition processing unit 105 outputs to the structure score calculation unit 110 the feature vector sequence (i.e. output of the speech analysis processing unit) and the N-best hypothesis list (i.e. output of the recognition engine having received as input this feature vector sequence). The speech recognition processing unit 105 also outputs the N-best hypothesis list and the speech recognition score for each hypothesis (i.e. likelihood value) to the ranking unit 150.

More specifically, the structure score calculation unit 110 is equipped with an inter-distribution distance calculation unit 115, a logarithmic likelihood calculation unit 120, a normalization unit 130, and a weighting unit 135. The structure score calculation unit 110 outputs to the weight learning unit 145 during the below described learning of phoneme pair-by-pair weights, and outputs the finally determined hypothesis-by-hypothesis structure scores to the ranking unit during real testing. Next, each element of the structure score calculation unit 110 will be explained.

Figure 3:
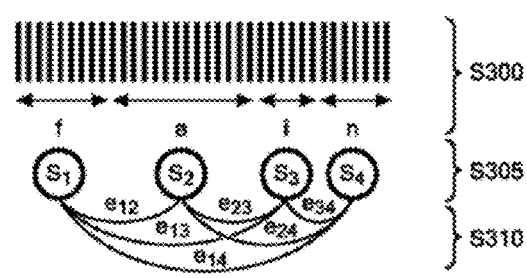
FIG. 3 is a schematic drawing for explanation of the method of extraction of invariant structure from phoneme alignment.

The inter-distribution distance calculation unit 115, with respect to each hypothesis listed in the N-best list, calculates the phoneme pair inter-distribution distances for all phoneme pairs composing this hypothesis. Processing by the inter-distribution distance calculation unit 115 will be explained while referring to FIG. 3. The inter-distribution distance calculation unit 115 firstly, with respect to each hypothesis of the N-best list acquired from the speech recognition processing unit 105, performs association between the phonemes composing this hypothesis and the feature vector sequence acquired similarly from the speech recognition processing unit 105, and the inter-distribution distance calculation unit 115 obtains condition-by-condition alignment of phonemes (S300). Thereafter, the inter-distribution distance calculation unit 115 infers the phoneme distributions $S_1, S_2, \ldots$ (e.g. normal distribution) from the feature quantities that were aligned for each condition of each phoneme (S305). Finally, the inter-distribution distance calculation unit 115 calculates the inter-distribution distances $e_{12}, e_{13}, \ldots$ (S310).

During the aforementioned S305, when a feature vector $x_1, \ldots x_n$ is allocated to a certain condition of a certain phoneme, the parameter mean $$\hat{\mu}_i \qquad \text{[Formula 1]}$$

and the variance $$\hat{\sigma}_i^2 \qquad \text{[Formula 2]}$$

are inferred by the following formulae based on maximum likelihood estimation.

$$\hat{\mu} = \frac{1}{n}\sum_{k=1}^{n} x_k \qquad \text{[Formula 3]}$$

$$\hat{\sigma}^2 = \frac{1}{n}\sum_{k=1}^{n} (x_k - \bar{x})^2 \qquad \text{[Formula 4]}$$

Moreover, during the aforementioned S310, when the Bhattacharyya distance for example is used as the inter-distribution distance, the distance between the two normal distributions $$S_i(\hat{\mu}_i, \hat{\sigma}_i^2) \qquad \text{[Formula 5]}$$

and $$S_j(\hat{\mu}_j, \hat{\sigma}_j^2) \qquad \text{[Formula 6]}$$

as the Bhattacharyya distance BD is found from the following formula. Furthermore, the symbol T indicates transposition.

$$BD = \frac{1}{8}\mu_{ij}^T\left(\frac{\sigma_i + \sigma_j}{2}\right)^{-1}\mu_{ij} + \frac{1}{2}\ln\frac{|(\sigma_i + \sigma_j)/2|}{|\sigma_i|^{\frac{1}{2}}|\sigma_j|^{\frac{1}{2}}} \quad \text{[Formula 7]}$$

where, $$\mu_{ij} = |\mu_i - \mu_j|$$

The f-divergence may be used as the inter-distribution distance, and there is no restriction to use of the Bhattacharyya distance. Refer, for example, to Bhattacharyya, A., "On a measure of divergence between two statistical populations defined by probability distributions," Bull. Calcutta Math. Soc. 35, pp. 99-109, 1943 for further details on the Bhattacharyya distance.

The logarithmic likelihood calculation unit 120 reads from the statistical edge model storage unit 125 the distribution of inter-distribution distances between corresponding phonemes for each inter-distribution distance of all the hypothesis-by-hypothesis phonone pairs calculated by the inter-distribution distance calculation unit 115, and the logarithmic likelihood calculation unit 120 calculates the logarithmic likelihood with respect to the read-out distributions. The distributions of inter-distribution distances for all phoneme pairs stored in the statistical edge model storage unit 125 (referred to hereinafter as the Statistical Edge Model, SEM) it taken to mean distributions calculated beforehand using the training data. The SEM training will be explained while referring to part of FIG. 4. During SEM training, the pairs of two phonemes are labeled (S400), the inter-distribution distance is found for each phoneme pair, the inter-distribution distances are summed for each phoneme pair (S405), and inference is performed using an EM algorithm taking the phoneme pair-by-pair SEM to have a Gaussian mixture model (S410).

The logarithmic likelihood with respect to the Gaussian mixture model corresponding to the inter-distributions distance x of a certain phoneme pair is calculated by summing the products of the likelihood of the inter-distribution distance with respect to each normal distribution composing the Gaussian mixture model and the weights of such normal distributions. The likelihood of an inter-distribution distance x with respect to the normal distribution $$N(\hat{\mu}, \hat{\sigma}^2) \quad \text{[Formula 8]}$$

is calculated by the following formula.

$$\frac{1}{\sqrt{2\pi\sigma^2}}\exp\left(-\frac{(x-\mu)^2}{2\sigma^2}\right) \quad \text{[Formula 9]}$$

Returning to FIG. 1, the normalization unit 130 performs normalization by multiplying the phoneme continuous length (frame count) by the logarithmic likelihood with respect to phoneme pair-by-pair SEM calculated by the logarithmic likelihood calculation unit 120. Since the speech recognition score becomes larger as the utterance length becomes greater, it is necessary that the structure score take into account phoneme length. Therefore the normalization unit 130 multiplies the frame count aligned with the phoneme by the phoneme pair-by-pair logarithmic likelihood, and appends a time direction coefficient for the structure score.

Rather than the aforementioned normalization processing, or in addition to such normalization processing, the normalization unit 130 may normalize the aforementioned logarithmic likelihood by dividing the phoneme pair-by-pair logarithmic likelihood by the number of different phoneme pair combinations appearing within the hypotheses. By this means, differences in structure scores between hypotheses due to differences in the phoneme counts disappear. Furthermore, although the continuous length of the actual test data phonemes and the training data used during the below described learning of weighting of the relative relationship of the phoneme pair are different, inference of stable weightings may be anticipated by the normalization treatment by the normalization unit 130.

Here, performance of normalization in the time direction by the above described normalization will be explained while referring to FIG. 5. Here for descriptive purposes, all weighting vector elements will be set to 1. Firstly, a case will be considered in which N phonemes $P_1, \ldots, P_N$ appear in a certain hypothesis. When the logarithmic likelihood of the edge $e_{ij}$ between phonemes $P_i$ and $P_j$ is expressed by $L(e_{ij})$, the average $S_i$ of the logarithmic likelihood of the phoneme $P_i$ being one half of a phoneme pair of the edge $e_{ij}$ (j=1, ..., N, where j≠1) is expressed by the following formula.

$$S_i = \sum_j \frac{L(e_{ij})}{N-1} \quad \text{[Formula 10]}$$

In order to normalize this in the time direction, the average $S_i$ may be multiplied by the phoneme $P_i$ continuous length (frame count) $T_i$ to give $S_i T_i$. If the below described phoneme pair-by-pair relative relationship weights have all been set to 1, the value of the sum for $S_i T$ for all phonemes $P_i$ (i=1, ... N) within the hypothesis becomes the structure score.

Figure 5:
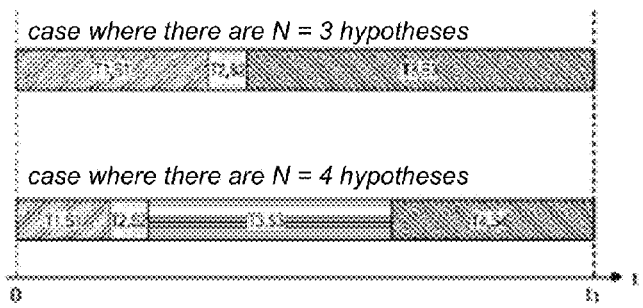
FIG. 5 shows an example hypothesis having two different phoneme counts.

FIG. 5 is a drawing comparing structures scores of 2 hypotheses having different phoneme pair-by-pair relative relationship weights with respect to the same input sound. Within FIG. 5, the upper level indicates the structure score for the phoneme count N=3 hypothesis, and the lower level indicates the structure score for the phoneme count N=4 hypothesis. Time is indicated along the horizontal axis. Since the continuation length is the same even though the phoneme count is different as shown in the figure, the structure score is normalized in the time direction. A score based on the conventional structure is calculated without consideration of the continuation length of each phoneme or the phoneme count within the hypothesis. By normalization processing, it is possible to impart a suitable score even for hypotheses that have different phoneme counts.

The normalization unit 130 sums the logarithmic likelihoods pair-by-pair normalized for phonemes appearing within the hypothesis, and produces a pre-weighting structure score vector $S_{structure}$ by the following formula.

$$S_{structure} = \begin{bmatrix} s_{a-i} \\ s_{a-u} \\ s_{a-e} \\ \vdots \end{bmatrix} \quad \text{[Formula 11]}$$

The number of structure score vector $S_{structure}$ dimensions indicated by the above formula is $M/(M-1)/2$, taking the total phoneme count present within the target language to be M. The values of edge vector elements that were not observed within the hypothesis are set to 0, and the values for vector elements of the observed edges $e_{ij}$ (i, j=1, ..., N; where j≠i)

are set based on the following formula. Within the following formula, $T_i$ indicates the phoneme Pi continuation length (frame count).

$$S_{i-j} = (T_i + T_j)\frac{L(e_{ij})}{N-1}$$ [Formula 12]

Referring to FIG. 6, a specific example will be explained of the pre-weighting structure score vector $S_{structure}$ produced by the normalization unit 130. FIG. 6 shows the structure score vector $S_{structure}$ for the hypothesis "k o_n n i ch i w a." Since the phonemes a, i, and o are observed within the hypothesis, the vector elements for these phonemes are set to the value (xx≠0, yy≠0). In particular, since the phonemes a and i appear twice within the hypothesis, it should be noted that the sum values of the normalized logarithmic likelihoods are set for the respective appearances in the corresponding vector elements. On the other hand, the phonemes u and e are not observed within the hypothesis, and thus the values of the edge vector elements relating to phoneme pairs including these phonemes are set to 0.

Figure 4:
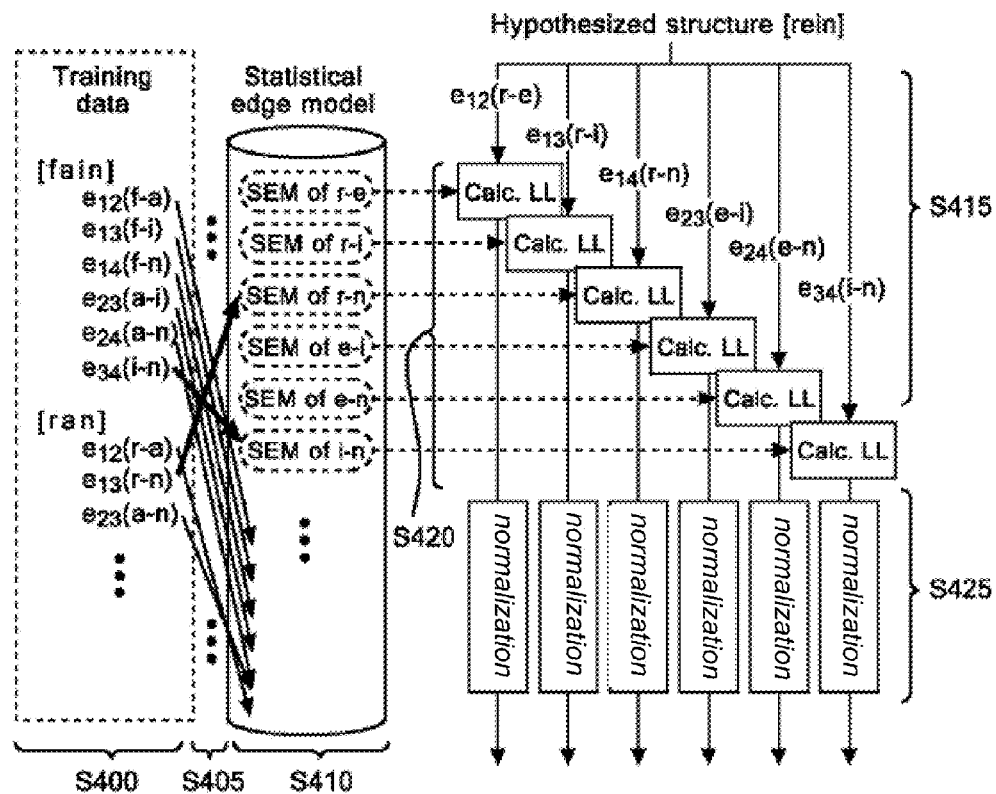
FIG. 4 schematic drawing for explanation of a statistical edge model and a method of calculation up to normalization of logarithmic likelihood.

Next, while referring to FIG. 4, the calculation method up to logarithmic likelihood normalization will be explained. Firstly, with respect to all N-best hypotheses, for all phoneme pairs constituting such hypotheses, the phoneme pair inter-distribution distance is calculated by the inter-distribution distance calculation unit 115 (S415). Thereafter, for the inter-distribution distance of each phoneme pair calculated by the inter-distribution distance calculation unit 115, the corresponding SEM is read out from the statistical edge model storage unit 125, and logarithmic likelihood calculation unit 120 calculates the logarithmic likelihood for this SEM (S420). Thereafter, the normalization unit 130 performs at least one of the following for normalization processing of logarithmic likelihood (S425): processing to multiply this phoneme continuation length (frame count) by the phoneme pair-by-pair logarithmic likelihood calculated by the logarithmic likelihood calculation unit 120, or processing to divide the phoneme pair-by-pair likelihood by the number of different combinations of pairs of phonemes appearing in the hypothesis.

Returning again to FIG. 1, with respect to each hypothesis listed in the N-best list, the weighting unit 135, for all phoneme pairs constituting such hypotheses, calculates a structure score, i.e. a score from summing the products of phoneme pair-by-pair weighting times the logarithmic likelihood of the normalized phoneme pair inter-distribution distance. Here, the phoneme pair-by-pair relative relationship weighting is read out from the weighting data storage unit 140, and the method of calculation of this weighting will be explained in relation to the weight learning unit 145.

The weighting data storage unit 140 stores data in vector format as a weight vector W expressed by the following formula.

$$W = \begin{bmatrix} w_{a-i} \\ w_{a-u} \\ w_{a-e} \\ \vdots \end{bmatrix}$$ [Formula 13]

In the same manner as for the structure score vector, the number of dimensions of the weight vector expressed by the above formula is M(M−1)/2, where M is taken to be the total phoneme count existing in the target language. The weighting unit 135 multiplies the pre-weighting structure score vector $S_{structure}$ by the aforementioned weight vector W to calculate the structure score.

Scoring based on the conventional configuration has been found by treating all relationships between phonemes as equal. Thus improvement seen in the recognition rate has only occurred for the simple task that is continuous digit speech recognition. According to the invention of the present application, a structure score is calculated while considering the phoneme pair-by-pair degree of importance in such speech recognition. As one example of phoneme pair-by-pair weighting, weighting of pairs occurring between vowel sounds and pairs related to silence may be set so as to be larger than the weighting for other phoneme pairs. More preferably, phoneme pair-by-pair weighting is learned by the below described weight learning unit 145 by use of training data.

The ranking unit 150, finds the total value of the structure score and the speech recognition score, and applies the number of hypotheses listed in the N-best list based to this total value as a new ranking for each hypothesis listed in the N-best list. The total value $S_{structure}$ calculated by the ranking unit 150 is expressed by the following formula.

$$S_{proposed} = S_{ASR} + W^T S_{structure}$$ [Formula 14]

The weight learning unit 145 receives the result of processing by the structure score calculation unit 110 that has received as input results of the speech recognition processing unit 105 with respect to the training sound data having correct answer labeling, and the weight learning unit 145 learns phoneme pair-by-pair weighting (the aforementioned weight vector W) so as to correctly perform ranking of hypotheses based on the total value of the speech recognition score and structure score. As an example, the weight learning unit 145 learns phoneme pair-by-pair weighting by taking a hypothesis that has a word error rate (WER) of zero or an hypothesis with the smallest word error rate as a positive example, and by taking the remaining hypotheses as negative examples. Furthermore, data that differ from the aforementioned SEM training data are preferably used as training data for the weight vector W. This preference is due to the possibility of not learning appropriately due to a tendency for errors not to arise when training data are used jointly.

The utilized weighting learning method is exemplified by perceptron or averaged Perceptron. According to Perceptron, when a result obtained using inferred weights differs from the correct answer, the weighting is revised so as to approach the correct answer.

Averaged perceptron improves the aforementioned Perceptron and uses an average of weighting of all training data as the weighting.

More specifically, when the positive example structure vector is taken to be $S_p$, and when the negative example structure vector is taken to be $S_n$, if the negative example structure score according to perceptron is better than the positive example structure score, then the weight vector W is revised to $W_{new}$ in the below described manner.

$$W_{new} = W + \rho \frac{S_p - S_n}{|S_p - S_n|}$$ [Formula 15]

In the above formula, ρ is the training rate for determining the effect imparted by the training data on the weighting. When a high value is used for the training rate, changes in W become large, and there is the possibility of rapid convergence, although there is simultaneously the possibility of divergence. On the other hand, when a low value of the training rate is used, W convergence becomes slow, although this results in a lower possibility of divergence. Therefore training is preferably promoted initially by a large value, and the training rate value is preferably gradually decreased thereafter. Furthermore averaged perceptron may be obtained by taking an average of weightings obtained during processing such as described above.

For further details, refer to Y. Freund, "Large margin classification using the perceptron algorithm," RE Schapire Machine Learning, 1999. The aforementioned learning of weightings is not limited to perceptron or averaged perceptron, and it is permissible to use other linear classification algorithms, e.g. confidence weighted linear regression or the like.

Figure 7:
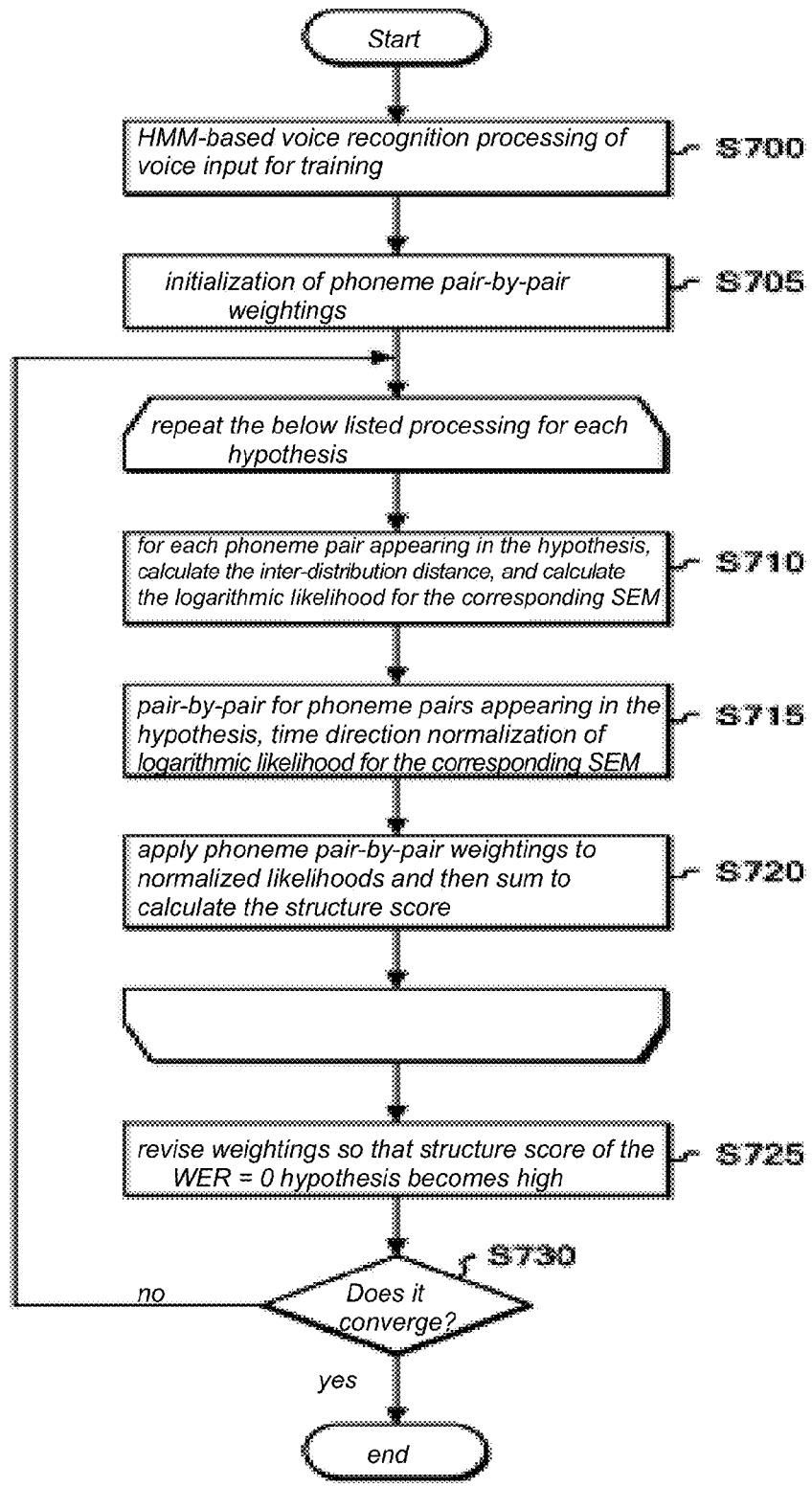
FIG. 7 shows an example of flow of weight inference processing that is performed as pre-processing prior to the processing shown in FIG. 8.
Figure 8:
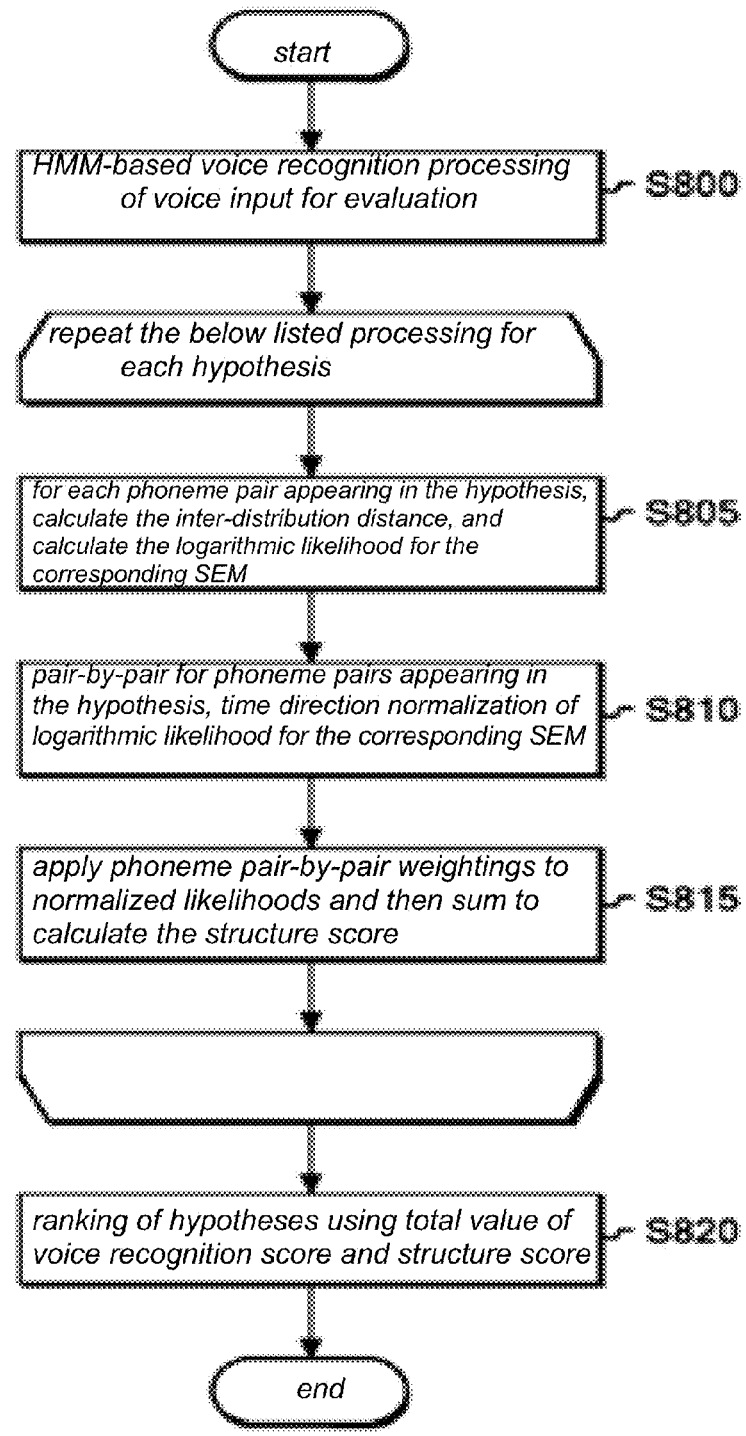
FIG. 8 shows an example of flow of large vocabulary continuous speech recognition processing according to an embodiment of the invention of the present application.

Next, large vocabulary continuous speech recognition processing by an embodiment of the invention of the present application will be described while referring to FIGS. 7 and 8. FIG. 7 is a flowchart showing an example of the flow of weighting interference processing that is performed as preprocessing for the processing shown in FIG. 8. FIG. 8 is a flowchart showing an example of flow of large vocabulary continuous speech recognition processing according to an embodiment of the invention of the present application.

In FIG. 7, weighting inference processing starts with step 700. The information processing device 100 executes speech recognition processing based on HMM on sound data for training that has appended correct answer labeling and that was acquired as input, and the information processing device 100 outputs the N-best hypothesis list together with the speech recognition scores (likelihood values). Thereafter, the information processing device 100 initializes the phoneme pair-by-pair weightings stored in the weighting data storage unit 140 (step 705).

Next, the information processing device 100 repeats the series of processing from step 710 to step 720 for each hypothesis listed in the N-best list. Firstly, the information processing device 100 calculates the inter-distribution distances pair-by-pair for phoneme pairs appearing within the hypotheses, and the information processing device 100 reads the corresponding SEM from the statistical edge model storage unit 125 and calculates the logarithmic likelihood for the SEM (step 710).

Thereafter, the information processing device 100 performs time direction normalization (step 715) for the phoneme pair-by-pair logarithmic likelihoods found during step 710. Time direction normalization in the aforementioned manner may be performed by multiplication of the logarithmic likelihood for the phoneme pair-by-pair edge times the frame count for these phonemes, and/or by dividing the logarithmic likelihood for the phoneme pair-by-pair edge by the number of different combinations to two different phonemes appearing within the hypothesis.

Next, the information processing device 100 applies the phoneme pair-by-pair weightings to the logarithmic likelihoods normalized for all phoneme pairs appearing within the hypothesis and sums the results to calculate the structure score (step 720). When the aforementioned steps have been completed for all hypotheses listed in the N-best list, then the information processing device 100, based on the correct answer labeling attached to the training sound data, revises the phoneme pair-by-pair weightings (step 725) stored in the weighing data storage unit 140 so as to be able to correctly perform hypothesis ranking based on the total value of the speech recognition score and the structure score.

In the above described manner, revision of the weightings may use a linear classification algorithm such as averaged Perceptron or Perceptron, and the revision is preferably performed so that a hypothesis having a word error rate (WER) of 0 or a hypotheses having the lowest word error rate has the highest structure score. Thereafter, the information processing device 100 makes a determination of whether the phoneme pair-by-pair weighting values have converged (step 730). If it is determined that there has not been convergence (step 730 result=NO), processing returns to immediately after step 705. On the other hand, is it is determined that there has been convergence (step 730 result=YES), processing ends.

In FIG. 8, large vocabulary continuous speech recognition processing starts at step 800. Based on HMM for the evaluation sound data acquired as input, the information processing device 100 executes speech recognition processing, and the information processing device 100 outputs the N-best hypothesis list together with the speech recognition scores (likelihood values). Thereafter, the information processing device 100 repeats the series of processing from step 805 to step 815 for each hypothesis listed in the N-best list.

Firstly, the information processing device 100 calculates the inter-distribution distance for each phoneme pair appearing within the hypotheses, reads the corresponding SEM from the statistical edge model storage unit 125, and calculates logarithmic likelihood for the SEM (step 805). Thereafter, the information processing device 100 performs time direction normalization (step 810) on the logarithmic likelihoods for the phoneme pair-by-pair SEM found during step 805. Time direction normalization in the above described manner may be performed by multiplying the phoneme pair-by-pair inter-distribution distance logarithmic likelihood by the frame count for such phonemes, and/or by dividing the phoneme pair-by-pair inter-distribution distance logarithmic likelihood by the number of different combinations of phonemes appearing within the hypothesis.

Thereafter, the information processing device 100 calculates the structure scores (step 815) by applying the phoneme pair-by-pair weightings stored in the weighting data storage unit 140 to the normalized logarithmic likelihoods of all phoneme pairs appearing in the hypothesis and summing the results. When the aforementioned series of processing has been completed for all of the hypotheses listed in the N-best list, then the information processing device 100 performs ranking of the multiple hypotheses listed in the N-best list based on the totals of the respective speech recognition score and structure score (step 820). Then processing ends.

Next, while referring to FIG. 9, results of an experiment using the invention of the present application for a Japanese language large vocabulary dictation task will be explained. The experimental conditions were as follows.
1. Size of vocabulary: about 110,000 words
2. Test speech: about 600 sentences
3. Using a HMM-based speech recognition system, outputted 10 best.

The experiment results are shown in the table of FIG. 9. The upper row of results of the table shows results when using only the conventional HMM-based speech recognition score, and the lower level of results shows results when using the summed value of the speech recognition score and the structure score of the invention of the present application. Furthermore, the structure score was calculated by summing the weighed normalized likelihoods with respect to each edge. As may be understood from looking at the table, a decrease of error rate of 6.69% was experimentally achieved. Furthermore, results of speech recognition using the conventional acoustic invariant structure were the same as those using only the score of speech recognition based on conventional HMM.

Figure 10:
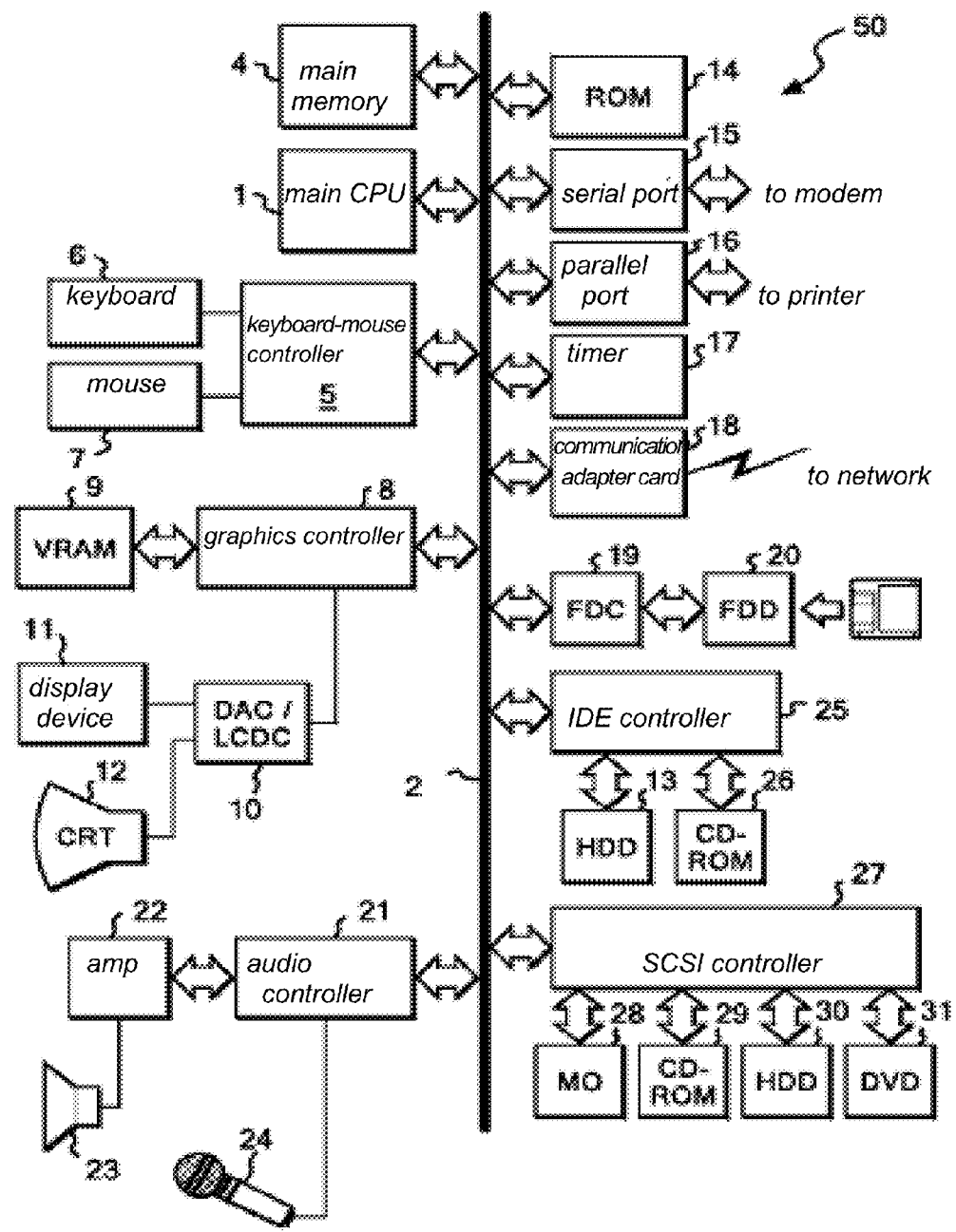
FIG. 10 shows an example of the hardware configuration of a computer that is suitable for implementation of the information processing device 100 according to an embodiment of the invention of the present application.

FIG. 10 is a drawing showing an example of hardware structure of a computer 50 that is suitable for implementation of the present invention. The computer 50 includes a main CPU 1 (Central Processing Unit) connected to a bus 2 and a main memory 4. Moreover, hard disk devices 13 and 30 and a removable storage device (external memory system for which the memory media may be exchanged, such as CD-ROM devices 26 and 29, a flexible disk device 20, a MO device 28, or a DVD device 31) is connected to the bus 2 through an IDE controller 25, SCSI controller 27, or the like.

A memory medium (such as a flexible disk, MO, CD-ROM, or DVD-ROM) is inserted into the removable storage device. In cooperation with the operating system, the CPU 1 receives commands and is able to record a computer program for execution of the invention of the present application to these recording media or hard disk devices 13, 30 and ROM 14. That is to say, on the numerous memory devices explained above, due to installation on the computer 50, a large vocabulary continuous speech recognition program of an embodiment of the invention of the present invention for running the computer 50, and data such as phoneme pair-by-pair weighting data and phoneme pair-by-pair SEM, may be recorded.

The aforementioned large vocabulary continuous speech recognition program includes a speech recognition processing module, a structure score calculation module, a weighting learning module, and a ranking module. These modules operate the CPU 1, and cause functioning of the computer 50 as the speech recognition processing unit 100, structure score calculation unit 110, and ranking unit 150, respectively. A structure score module, as well as the inter-distribution distance calculation module, logarithmic likelihood calculation module, normalized module, and weighting module are included. These modules run on the CPU 1 and cause the computer 50 to function as each of the inter-distribution distance calculation unit 115, logarithmic likelihood calculation unit 120, normalization unit 130, and weighting unit 135. The computer program may be compressed or may be divided and recorded on multiple media.

Through the keyboard-mouse controller 5, the computer 50 receives input from a device such as the keyboard 6 or the mouse 7. Through the audio controller 21, the computer 20 receives input from the microphone 24 and outputs sound from the speaker 23. The computer 50 is connected through a graphics controller 10 to a display device 11 for providing visual data to the user. The computer 50 is capable of performing communication with other computers or the like through a network adapter 18 (Ethernet (R)) card, Tolkien ring card, or the like.

As explained above, the computer 50 may be readily understood to be realizable by a normal personal computer, workstation, mainframe computer, or the like information device, or by a combination of such devices. Furthermore, the aforementioned constituent elements are exemplary, and each of these constituent elements does not necessarily form a necessary constituent element of the invention of the present application.

Although the invention of the present invention was explained above using embodiments, there is no limitation of the technical scope of the invention of the present application to the scope described in the aforementioned embodiment. The possibility of adding various types of modifications or improvements to the aforementioned embodiments will be clear to a person skilled in the art. Therefore aspects having such modifications or added improvements are naturally included within the technical scope of the invention of the present application.

The execution of all processing (i.e. operation, procedure, step, stage, or the like) of the devices, systems, programs, and methods indicated in the scope of the claims, specification, and figures should be understood to be capable of being done in arbitrary order unless clearly indicated by expressions such as "beforehand," "prior to," or the like or unless later processing uses output from previous processing. Moreover, even when output of prior processing is used during later processing, it should be understood that it is possible to insert other processing between the earlier processing and the later processing, and it should be understood that even when other processing is described as being inserted therebetween, modification is possible such that the prior processing is executed immediately prior to performance of the later processing. Even though explanations were used for convenience that contained terms such as "firstly," "thereafter," "next," or the like in the scope of the claims, specification, and figures, execution is not necessarily restricted to taking place in that order.

The invention claimed is:

1. A large vocabulary continuous speech recognition method executed by a computer;
    the method comprises the steps of:
    (a) acquiring by said computer a speech data as input;
    (b) performing by said computer speech recognition with respect to said acquired speech data, and outputting a plurality of hypotheses that are a recognition result with a plurality of speech recognition scores, each speech recognition score being a score indicating apparent correctness of a speech recognition result for each hypothesis;
    (c) calculating by said computer a structure score for each hypothesis, the structure score being obtained by, for all pairs of phonemes consisting of the hypothesis, multiplying a likelihood of inter-distribution distance of a pair of phonemes by weighting for said pair of phonemes and performing summation; and
    (d) determining by said computer a total value of said structure score and said speech recognition score for each hypothesis, and based on said total value, ranking said plurality of hypotheses;
    wherein, in said step (c), said pair-by-pair weightings of said phoneme pairs are set such that weightings between pairs of vowel sounds and weightings of pairs relating to silence are set higher than weightings concerning pairs of other phonemes.

2. The large vocabulary continuous speech recognition method according to claim 1;
    wherein said method further comprises the step of:
    (e) performing by said computer steps (b) and (c) with respect to speech data for training and learning pair-by-pair weightings for said phoneme pairs so as to correctly perform hypothesis ranking by said summation value of said speech recognition score and said structure score.

3. The large vocabulary continuous speech recognition method according to claim 2;
    wherein, in said step (c), said computer multiplies said inter-distribution distance likelihood of said phoneme pair by a frame count of said phoneme and divides by number of different combinations of pairs of phonemes appearing within said hypothesis to normalize said likelihood.

4. The large vocabulary continuous speech recognition method according to claim 2;

wherein, in said step (c), said computer multiplies said likelihood of said inter-distribution distance of said pair of phonemes by a frame count of said phonemes so as to normalize said likelihood.

5. The large vocabulary continuous speech recognition method according to claim 2;
wherein, in said step (e), said learning of pair-by-pair weights of said phoneme pairs is performed by taking hypotheses having a zero word error rate as positive examples and by taking remaining hypotheses as negative examples.

6. The large vocabulary continuous speech recognition method according to claim 2;
wherein, in said step (e), said learning of pair-by-pair weights of said phoneme pairs is performed by taking a hypothesis having a lowest word error rate as a positive example, and by learning the remaining hypotheses as negative examples.

7. A computer program product for performing a large vocabulary continuous speech recognition method, the computer program product comprising:
a tangible storage device readable by a processing unit and storing instructions for execution by the processing unit for causing a computer to execute the steps of:
(a) acquiring a speech data as input;
(b) performing speech recognition with respect to said acquired speech data, and outputting a plurality of hypotheses that are a recognition result with a plurality of speech recognition scores, each speech recognition score being a score indicating apparent correctness of a speech recognition result for each hypothesis;
(c) calculating a structure score for each hypothesis, the structure score being obtained by, for all pairs of phonemes consisting of the hypothesis, multiplying a likelihood of inter-distribution distance of a pair of phonemes by weighting for said pair of phonemes and performing summation; and
(d) determining a total value of said structure score and said speech recognition score for each hypothesis, and based on said total value, ranking said plurality of hypotheses;
wherein, in said step (c), said pair-by-pair weightings of said phoneme pairs are set such that weightings between pairs of vowel sounds and weightings of pairs relating to silence are set higher than weightings concerning pairs of other phonemes.

8. The computer program product for large vocabulary continuous speech recognition according to claim 7;
wherein the program further causes said computer to execute the step of:
(e) performing steps (b) and (c) with respect to speech data for training and learning pair-by-pair weightings for said phoneme pairs so as to correctly perform hypothesis ranking by said summation value of said speech recognition score and said structure score.

9. The computer program product for large vocabulary continuous speech recognition according to claim 7;
wherein, in said step (c), the program causes said computer to multiply said inter-distribution distance likelihood of said phoneme pair by a frame count of said phoneme and divides by number of different combinations of pairs of phonemes appearing within said hypothesis to normalize said likelihood.

10. The computer program product for large vocabulary continuous speech recognition according to claim 7;
wherein, in said step (c), the program makes said computer multiply said likelihood of said inter-distribution distance of said pair of phonemes by a frame count of said phonemes so as to normalize said likelihood.

11. An information processing device for performance of large vocabulary continuous speech recognition, the information processing device comprising:
a memory;
a processor unit in communication with the memory that performs a method comprising:
acquiring a speech as input;
performing speech recognition with respect to said acquired speech,
outputting a plurality of hypotheses that are a recognition result with a plurality of speech recognition scores, each speech recognition score being a score indicating apparent correctness of a speech recognition result for each hypothesis;
calculating a structure score for each hypothesis, the structure score being obtained by, for all pairs of phonemes consisting of the hypothesis, multiplying a likelihood of inter-distribution distance of a pair of phonemes by weighting for said pair of phonemes and performing summation; and
determining a total value of said structure score and said speech recognition score for each hypothesis, and based on said total value, for ranking said plurality of hypotheses;
wherein, in said calculating step, said pair-by-pair weightings of said phoneme pairs are set such that weightings between pairs of vowel sounds and weightings of pairs relating to silence are set higher than weightings concerning pairs of other phonemes.

12. The information processing device according to claim 11, wherein said processor unit further performs a method comprising:
training and learning a pair-by-pair weightings for said phoneme pairs so as to correctly perform hypothesis ranking by said summation value of said speech recognition score and said structure score.

13. The information processing device according to claim 11, wherein said processor unit further performs multiplication of said likelihood of said inter-distribution distance of said pair of phonemes by a frame count of said phonemes so as to normalize said likelihood.

14. The information processing device according to claim 11, wherein said processor unit further performs multiplication of said inter-distribution distance likelihood of said phoneme pair by a frame count of said phoneme and division by number of different combinations of pairs of phonemes appearing within said hypothesis to normalize said likelihood.

* * * * *